United States Patent [19]
Koch et al.

[11] 3,791,454
[45] Feb. 12, 1974

[54] MULTI-LOAD TRACTOR HITCH SYSTEM

[75] Inventors: James Allan Koch, Hudson; Donald Leroy Henderson, Waterloo, both of Iowa

[73] Assignee: Deere & Company, Moline, Ill.

[22] Filed: May 16, 1973

[21] Appl. No.: 360,707

Related U.S. Application Data
[62] Division of Ser. No. 293,436, Sept. 29, 1972.

[52] U.S. Cl. ................................. 172/7, 172/439
[51] Int. Cl. ........................................ A01b 63/110
[58] Field of Search .......................... 172/7-12, 439; 280/460 A, 461 A

[56] References Cited
UNITED STATES PATENTS

| | | | |
|---|---|---|---|
| 3,351,137 | 11/1967 | Schulz et al. | 172/7 |
| 3,731,746 | 5/1973 | Walberg | 172/9 |
| 3,435,902 | 4/1969 | Folkerts | 172/7 |

*Primary Examiner*—Stephen C. Pellegrino

[57] ABSTRACT

A tractor includes a hitch system comprising spaced lower draft links carrying draft hooks at their distal ends and an upper center link in the form of an extensible and retractable hydraulic actuator and a drawbar. An inverted U-shaped arch member has opposite legs respectively pivotally connected to the draft links at locations intermediate the ends thereof by means establishing a horizontal transverse axis about which the arch member is swingable fore and aft. A swivel bracket including rollers is mounted for rolling movement along the transverse bight portion of the arch member between a stored position on one of the legs of the arch member and an operative position on the transverse bight portion of the arch member. The hitch structure may be arranged in a three-point hitch mode by suspending the center link-forming hydraulic actuator from the bight portion of the arch member by spring means and by connecting a draft hook to the end of the piston rod of the center link-forming actuator. The hitch structure may be arranged in a weight transfer mode by placing the swivel bracket in its operative position, by connecting the end of the piston rod of the center link-forming actuator to the bracket and by connecting a force transmitting member or link between the swivel bracket and the implement to be towed. The hitch structure includes draft responsive means for initiating automatic draft and weight transfer control, the draft responsive means being, in one embodiment, responsive to forces imposed on the lower draft links or on the drawbar and being responsive in a second embodiment to draft forces imposed on the center link-forming actuator.

3 Claims, 12 Drawing Figures

MULTI-LOAD TRACTOR HITCH SYSTEM

BACKGROUND OF THE INVENTION

This is a division of application Ser. No. 293,436, filed Sept. 29, 1972.

The present invention relates to a hitch system for agricultural tractors and more particularly relates to a hitch system convertible among various hitch or coupling modes for attaching fully-mounted, semi-mounted and towed vehicles to a tractor, the hitch system including automatic draft and weight transfer control.

Most of present day agricultural tractors are engineered for serving as the propelling unit for diverse implements for performing tillage, planting, cultivating and harvesting operations. These implements run the gamut of fully-mounted, semi-mounted and towed implements. Additionally, some of these implements include parts adapted to be driven by the tractor power take-off.

It has been found that for certain operations hitch control features such as automatic draft and weight transfer are invaluable.

Thus, it is appreciated that in order to accommodate the attaching of the aforementioned diverse implements and to afford desirable hitch control features that a tractor must be provided with a hitch system having diverse coupling capabilities and having appropriate hitch controls respectively operable for every coupling mode.

While hitch systems are available which have multi-coupling mode capabilities and have the desired controls, they often require that members be added or subtracted from the hitch system to convert it from one coupling mode to another and many of these members are quite heavy and/or difficult to install. Further, in many hitch systems some designs are compromised in order to avoid conflicting parts either to the extent that the hitch system does not operate entirely satisfactorily in some coupling modes or to the extent that some coupling modes are left out of the design.

SUMMARY OF THE INVENTION

According to the invention, there is provided a hitch system having diverse, compatible hitch modes and including appropriate hitch controls for each mode.

It is an object of the invention to provide a hitch system which is easily manually convertible among hith modes.

Another object is to provide a hitch system having a novel three-point hitch mode. More specifically, it is an object to provide draft hooks at the rear ends of each of the center and draft links of a three-point hitch and to resiliently suspend the upper link from an inverted U-shaped arch member pivotally coupled to the draft links for fore-and-aft rocking, the resilient suspension biasing the center link so as to keep the hook carried thereby engaged with the upper hitch part of an implement.

Still another object is to provide a hitch system, as aforementioned, which has a novel weight transfer hitch mode. More specifically, it is an object to provide a swivel bracket mounted for movement along the above-mentioned U-shaped arch member and to which the center link of the three-point hitch can be optionally connected; the center link being in the form of an extensible and retractable hydraulic actuator.

Yet another object of the invention is to provide a hitch system including novel hydraulic controls for automatically controlling the center link when the system is in the weight transfer mode, the control in one embodiment being responsive to the draft forces either imposed on the tractor drawbar or on the draft links and in a second embodiment being responsive to the draft forces imposed on the center link-forming actuator.

These and other objects will become apparent from the following description taken together with the appended drawings.

DESCRIPTION OF THE PREFERRED EMBODIMENT

Figure 1:
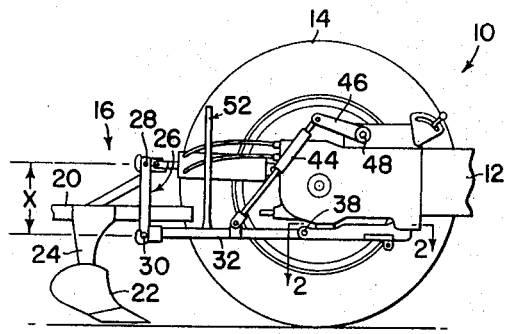
FIG. 1 is a fragmentary side view, with portions omitted, showing a typical arrangement of a tractor having a fully-mounted implement connected thereto, the hitch system being in a three-point hitch mode.
Figure 2:
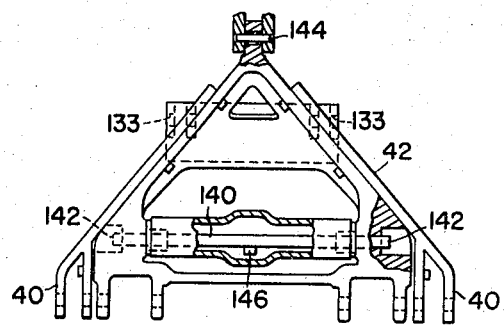
FIG. 2 is a view, partially in section, taken along the line 2—2 in FIG. 1.

Illustrated in the drawings is the rear portion of an agricultural tractor, designated in its entirety by the reference numeral 10, including a body or chassis 12 supported by a pair of rear traction wheels, only one of which is shown at 14.

Referring now to FIG. 1, the tractor shown therein is provided with a hitch system having a structure arranged in a three-point hitch mode and being connected to an earth-working implement here represented as a fully-mounted plow 16. The plow 16 is of conventional structure including a beam 20 to which a plurality of plow bottoms, only one being shown at 22, are connected through means of respective standards 24. Secured to the forward portion of the beam 20 is a mast structure 26, of conventional design, including an upper hitch part 28 and a pair of lower spaced hitch parts, only one being shown at 30. All of the hitching parts are cylindrical elements such as pins and rods or the like. The tractor hitch structure includes draft members which extend between the tractor body 12 and the hitch parts 28 and 30.

Specifically, referring additionally to FIGS. 2-5, the hitch structure includes a pair of lower, laterally spaced draft links 32 respectively including a pair of draft hooks 34 at their rear ends, the hooks 34 including upwardly opening jaws 36 in which are received the lower hitch parts 30 of the plow mast. The draft links 32 have their forward ends connected, as at ball-and-socket connectors 38, to a pair of clevises 40 extending rearwardly from the opposite legs of an A-frame 42 secured to the underside of the tractor body 12 by means to be described presently. Thus, the draft links 32 may be swung vertically about the connectors 38 and for the purpose there is provided a pair of lift links 44 respectively having one of their ends connected intermediate the ends of the draft links and having the other of their ends respectively connected to a pair of crank arms, only one being shown at 46, the crank arms 46 being integral with the opposite lateral ends of a transverse rockshaft 48 rotatably mounted in the body 12 and selectively rotatable by a one-way hydraulic actuator or rockshaft cylinder 50 (FIG. 11) also located in the body 12.

The draft links 32 are held in a fixed spaced relationship relative to each other by means of an inverted U-shaped arch member 52 having opposite legs 54 connected at their free ends to the links 32 at opposite locations intermediate the ends of the links by a pair of ball-and-socket connections, required for adequate degrees of freedom, only one being shown at 56 (FIG. 3), the connections establishing horizontal transverse pivot axis about which the member 52 is rockable.

A two-way hydraulic actuator 58 forms an upper center link of the hitch structure and includes a rearwardly extending piston rod terminating in a clevis to which a draft hook 59 is connected by a vertical pin 60 which permits the hook to swivel between cast stops on the clevis. A leaf spring 62 acts to center the hook. The hook 59 includes an upwardly opening jaw 64 in which is received the upper hitch part 28 of the plow mast. A pivot pin 65 connects the actuator cylinder end to the tractor body.

Figure 3:
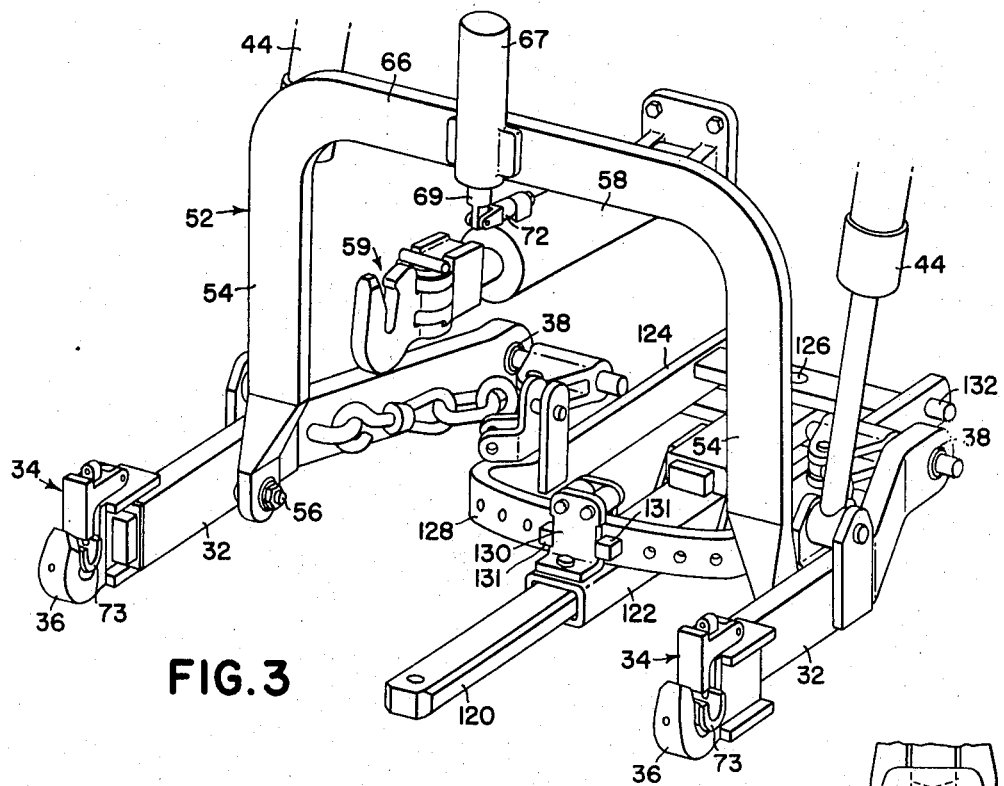
FIG. 3 is an enlarged perspective view of the hitch system shown in FIG. 1 but in addition showing a drawbar assembly.
Figure 4:
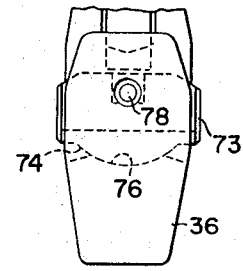
FIG. 4 is a fragmentary rear end view of one of the draft hooks shown in FIG. 3.
Figure 5:
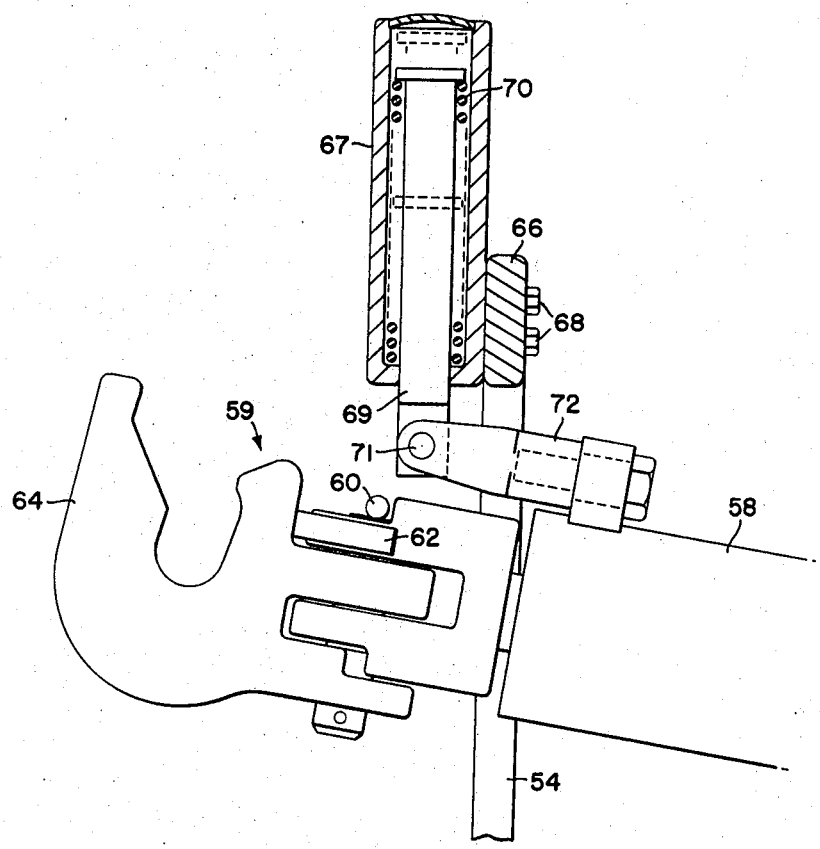
FIG. 5 is a fragmentary side view of the upper draft link.

As can best be seen in FIGS. 3 and 5, the actuator 58 extends beneath and is suspended from a transverse bight portion 66 of the member 52 by a compression spring assembly including a cylindrical cartridge 67 secured to the rearward surface of the bight portion by a plurality of bolts 68 and having a rod 69 received axially therein, the rod having a coil spring 70 disposed thereabout and having an upper head portion bearing on the spring and holding the latter against the bottom end of the cartridge. The lower end of the rod projects through the bottom end of the cartridge 67 and is pivotally connected, as at horizontal pin 71, to a swivel connection 72 fixed to the top of and arranged to swivel parallel to the axis of the actuator 58. Thus, when the above-described hitch structure is detached from an implement, as shown in FIG. 3, the spring assembly supports the actuator 58 in a generally horizontal position and affords flexibility whereby an operator can manipulate the actuator 58 to attach it to an implement hitch part. Also it is here noted that the spring 70 in addition serves to keep the jaw 64 engaged with an implement hitch part received therein. This is accomplished due to the fact that the opening in the jaw 64 is spaced above the openings in the jaws 36 a vertical amount chosen so as to be greater, when the actuator is freely suspended as in FIG. 3, than the vertical distance X between the upper and lower hitch parts of an implement such as shown in FIG. 1. Thus, the spring 70 is in compression once the hitch structure is connected to an implement as shown in FIG. 1. It is here noted that the spring 70 becomes fully compressed within a distance chosen such as to make it impossible for the actuator 58 to bounce low enough during transport, to become unhooked from the upper implement hitch part 28.

Also, it is here noted that the actuator 58 may be suspended from the arch member by resilient means other than the compression spring assembly. For example, leaf or tension springs may be used. Further, it is to be noted that the actuator 58 need not be suspended from the arch member 52 but may be supported at the top thereof; and the jaw 64 may open downwardly with the vertical distance between the opening in the jaw 64 and the openings in the jaws 36, when the actuator is freely supported by the arch member, being lesser than the vertical distance X, the resilient means then being arranged to bias the actuator downwardly to its freely supported position.

Cooperating with the manipulatable actuator 58 to aid the operator in connecting an implement such as the plow 16 to the actuator 58 and to the lower draft links 32 are a pair of removable inserts 73 respectively located in the bottoms of the openings in the jaws 36 of the draft hooks 34. The inserts 73 respectively include central spherical bearing portions 74 seated in complementary surfaces appearing in the jaw openings at 76. The inserts 73 are respectively held in place by a pair of dowel pins 78 (only one shown) located in the jaws on opposite sides of the openings and along respective fore-and-aft extending diameters of the bearing portions 74. Thus, the inserts 73 may undergo a limited amount of rocking about the dowel pins 78 for permitting an operator to more easily connect the hitch structure to the lower cylindrical hitch parts of an implement when such hitch parts are canted relative to the horizontal.

Figure 6:
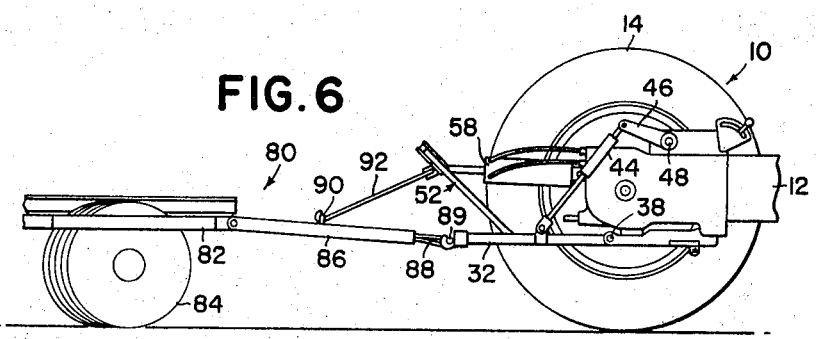
FIG. 6 is a fragmentary side view, with portions omitted, showing a typical arrangement of a tractor having a trailing implement connected thereto, the hitch system being in a weight transfer hitch mode.

Referring now to FIG. 6, the tractor 10 shown therein is provided with a hitch structure arranged in a weight-transfer hitch mode and being connected to an earth-working implement, here represented as a trailing disk harrow 80, it being noted that many parts of the hitch structure are identical to those previously described and they are given the same reference numerals.

Figure 8:
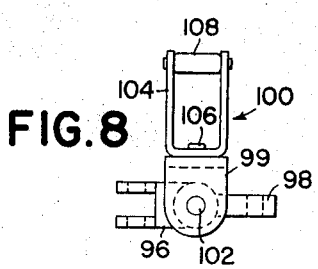
FIG. 8 is a side view of the swivel bracket.
Figure 9:
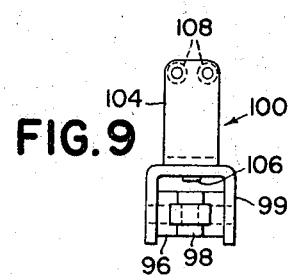
FIG. 9 is a front view of the swivel bracket shown in FIG. 8.

The harrow 80 is of conventional structure and includes a main frame 82 to which gangs of disks, one being shown at 84, are connected. A draft tongue 86 is pivoted to the forward end of the frame 82 and has a clevis 88 at its forward end, the clevis 88 being connected to an apertured cross bar 89 having opposite ends received in the openings of the jaws of the draft hooks 34. The tongue may be connected directly to drawbar 120 if drawbar has draft sensing capability as will be described below with reference to FIG. 10. Here shown pivotally connected intermediate the ends of the tongue 86, as at 90, is the rear end of a force transmitting link or member 92, which may have its rear end connected to the frame 82 if desired. The forward end of the link 92 is pivotally connected, as at upright pin 94 (FIG. 7), to a rearwardly extending clevis portion of a first pivot block 96. The clevis at the rearward end of the piston rod of the actuator 58 is pivotally connected, by means of a vertical pin (not shown), to the forwardly extending end of a second pivot block 98. As can best be seen in FIGS. 8 and 9, the pivot blocks 96 and 98 are pivotally connected to each other and to the downwardly extending legs of a first U-shaped part 99 of a swivel bracket 100 by means of a horizontal pin 102. The U-shaped part 99 is in turn pivotally connected to a second U-shaped part 104 by means of a pin 106 extending through the respective bight portions of the parts 99 and 104. The swivel bracket 100 further includes a pair of rollers 108 which are rotatably mounted on pins extending between and having their opposite ends located in the opposite legs of the second U-shaped part 104. When the swivel bracket 100 is in its operative position, shown in FIG. 7, the legs of the part 104 straddle the transverse bight portion 68 of the arch member 52 and the rollers 108 engage the upper surface thereof. Accordingly, in order to transfer more of the weight of the implement 80 to the tractor 10, the actuator 58 is retracted to swing the arch member 52 forwardly which results in the force transmitting link 90 exerting an increased upward force on the implement to cause an attendant increase in the portion of the weight of the implement supported by the tractor. In a similar but reverse manner, the portion of the weight of the implement 80 supported by the tractor 10 can be diminished by extending the actuator 58.

Figure 7:
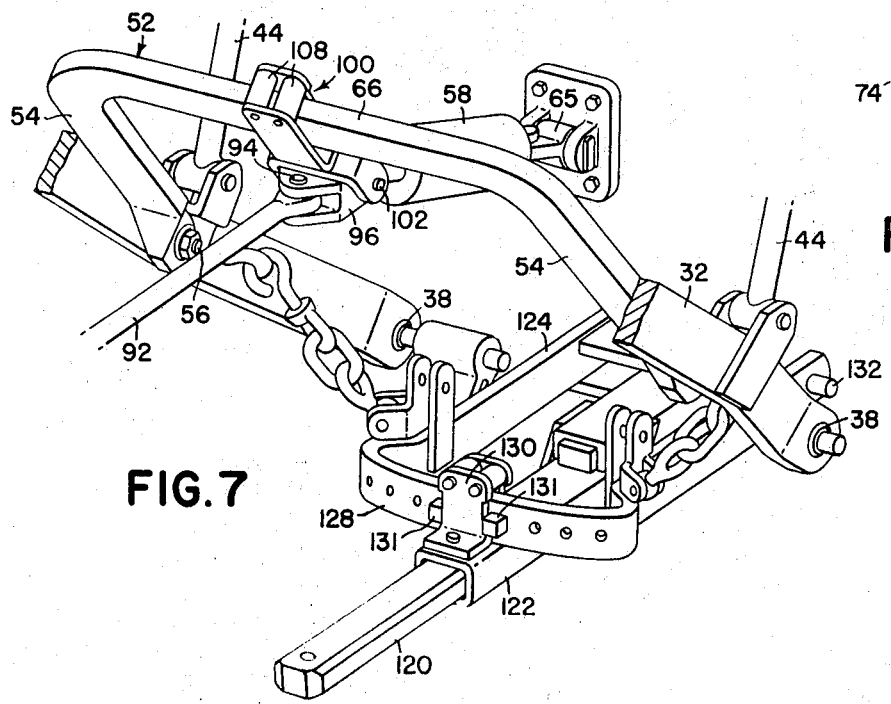
FIG. 7 is an enlarged perspective view of the hitch system shown in FIG. 6 but in addition showing the drawbar assembly.

From the description above, it will be apparent that the hitch structure can be easily converted from the three-point hitch mode, shown in FIG. 3, to the weight transfer hitch mode shown in FIG. 7, by disconnecting the end of the spring assembly rod 69 from the actuator 58, by removing the bolts 68 to disconnect the spring cartridge 67 from the arch member 52, by mounting the swivel block 100 in its operative position on the bight portion 66 of the arch member and by connecting the actuator 58 and the force transmitting link 92 to the swivel bracket 100. It is here noted that when not in use, the swivel bracket 100, along with the pivot blocks 96 and 98 may be placed in a stored position (not shown) on one or the other of the legs of the arch member 52.

Figure 10:
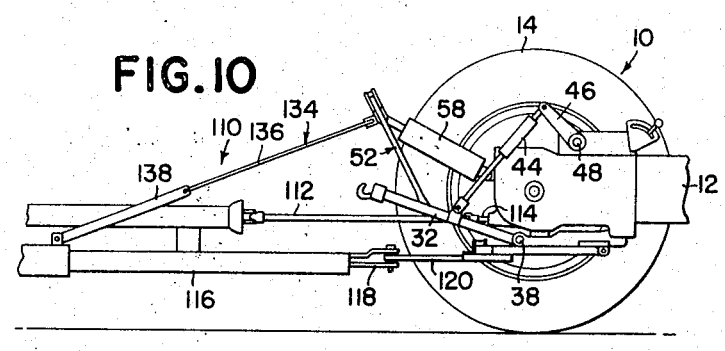
FIG. 10 is a view similar to FIG. 6 but showing the tractor connected to a power take-off driven implement.

Referring now to FIG. 10, there is shown the tractor 10 with a hitch structure arranged in a weight-transfer hitch mode similar to the arrangement in FIG. 6, but being connected to a trailing earth-working or harvesting implement 110 of a type having a power take-off driven tool or conveyor, or the like, (not shown). The implement 110 includes a forwardly extending power shaft 112 connected to a power take-off shaft 114 at the rear of the tractor. The power shaft 112 is supported generally vertically above a forwardly extending draft tongue 116. In order to ensure adequate working clearance for the power shaft 112, the arch member 52 is held in an elevated position by the lower draft links 32 and a clevis 118 at the forward end of the tongue 116 is connected to a rearwardly extending drawbar 120. As can best be seen in FIGS. 3 and 7, the drawbar 120 is received in a fore-and-aft extending sleeve member 122 which is pivotally connected to a drawbar frame 124, as at a pin 126 (FIG. 3), for horizontal swinging movement. The sleeve member 122 is supported, adjacent its rear end, for movement along an arcuate rear portion 128 of the frame 124 by means of a roller-containing bracket 130. The drawbar 120 may be permitted to pivot freely about the pin 126 or a pair of stops 131 may be used to hold the drawbar fixed, as shown in FIG. 7, or contained between desired limits.

The drawbar frame 124 includes a pair of oppositely extending pins 132 which are received in apertured ears 133 forming a part of the A-frame 42. Draft forces are thus transferred from the drawbar 120 to the A-frame 42. Connected to the swivel bracket 100 is a force transmitting linkage 134 comprising a first link 136 having its forward end pivotally connected to the pivot block 96 and having a pair of straps, only one being shown at 138, connected to its rear end, the straps 138 straddling the power shaft 112 and being connected to the draft tongue 116.

Thus, it can be appreciated that when the tractor is connected to an implement in the manner illustrated in FIG. 10 and the drawbar 120 is permitted to swing free, the lateral shifting movement of the swivel bracket 100 along the bight portion of the arch member 52 acts in conjunction with the drawbar to maintain a weight transfer relationship between the tractor and the implement while at the same time permitting the implement to trail the tractor during turns.

Figure 11:
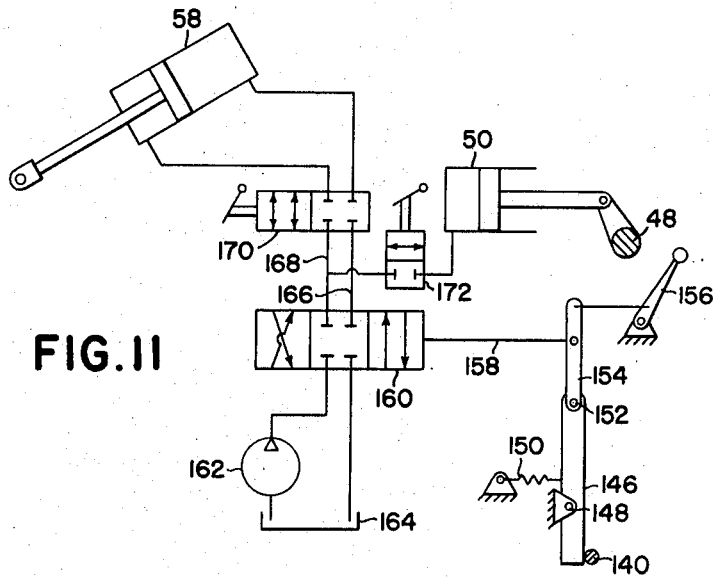
FIG. 11 is a schematic of a typical hydraulic circuit used to control the tractor hitch system.

The extension and retraction of the rockshaft cylinder 50, for adjusting the vertical disposition of the lower draft links 32 and the extension and retraction of the actuator 58 for adjusting the fore-and-aft disposition of the draft hook 60 or for initiating changes in weight transfer, may be selectively controlled either manually or automatically, the automatic control being in response to draft forces imposed on the hitch structure. For the purpose of automatic control, the A-frame 42 is connected to the tractor body 12 by means including a horizontal transverse elastic bar 140 located in a depending portion of the body 12 and having opposite terminal end portions received as at 142, in the opposite lateral side portions of the A-frame. The forward corner of the A-frame is connected to the body 12 by a pin and slot means 144 so that the A-frame may undergo limited fore-and-aft movement as the opposite ends of the bar 140 deflect when load is applied to the A-frame by the lower draft links 32. Rearward and forward deflection of the ends of the elastic bar 140 correspondingly causes the central portion of the elastic bar to deflect respectively forwardly and rearwardly. This movement of the elastic bar is used to actuate a control linkage including a signal lever 146 (FIG. 11) which is pivoted at 148 to the tractor body and has a lower end located in the path of movement of and biased against the central portion of the elastic bar 140 by means of a light spring 150. The upper end of the lever 146 is pivotally connected at 152 to the lower end of a secondary lever 154, the upper end of which is linked to a hand lever 156. A midportion of the secondary lever 154 is linked, as at 158, to one end of an axially shiftable main valve 160. Connected to one side of the main valve 160 are a pump 162 and a reservoir 164 and connected to the other side are a pair of lines 166 and 168. The valve 160 is a three-position valve and has a central neutral position, as shown in FIG. 11, wherein the lines 166 and 168 are blocked from fluid communication with the pump and reservoir, a first operative position to the right of the neutral position, wherein the line 166 is connected to the pump and the line 168 is connected to the reservoir, and a second operative position to the left of the neutral position, wherein the line 166 is connected to the reservoir and the line 168 is connected to the pump. Connected to the lines 166 and 168 is a manually controllable on-off valve 170 which is in turn connected to the opposite work ports of the actuator 58. The valve 170 is selectively shiftable between "on" and "off" positions for respectively permitting and interrupting the flow of fluid between the opposite ends of the actuator 58 and the lines 166 and 168. Similarly, a manually controllable on-off valve 172 is connected to the line 168 and to the single work port of the rockshaft cylinder 50, the valve 172 being selectively shiftable between "on" and "off" positions for respectively connecting and interrupting the flow of fluid between the cylinder and the line 168.

It is to be noted that the above-described draft sensing means is representative of the many draft sensing means which could be used to sense draft loads in the lower links 32 or in the drawbar 120 and send a signal to operate the main valve 160 and that the draft links and drawbar could just as well be provided with other resilient draft sensors or, for that matter, with hydraulic or electrical draft sensors without affecting the principles of the invention described herein.

Assuming that the hitch structure is in the three-point hitch mode shown in FIG. 3 and that the hydraulic control are as shown in FIG. 11, the operation of the above-described hitch structure is as follows. If it is desired to connect the plow 16 to the hitch structure, the operator will first back the tractor 10 into close proximity to the plow 16. If the upper and lower draft hooks 59 and 34 are not at a level below the level of the upper and lower hitch parts 28 and 30 of the plow mast, the operator will shift the on-off valve 172 to its "on" position and will manually shift the main valve 160 to the right to connect the rockshaft cylinder 50 to exhaust thus permitting the draft links 32 to gravitate to a lower position and thus dispose the hooks 59 and 34 at a lower position. The valve 160 is then returned to neutral. Once the draft hooks are at a level below the hitch parts 28 and 30, the operator will back the tractor until the openings in the hook jaws 36 are directly below the hitch parts. To connect the upper draft hook 59 with the upper hitch part 28 of the plow mast, the operator will adjust the draft hook 59 to its appropriate fore-and-aft disposition by shifting the on-off valves 170 and 172 respectively to their "on" and "off" positions and by shifting the main valve 160 to the right or left to selectively extend or retract the actuator 58. When the draft hook 59 is at the correct fore-and-aft location for engaging the jaw opening with the upper hitch part 28, the operator then will shift the main valve 160 to the left to connect the pump with the rockshaft cylinder 50 causing the latter to rotate the rockshaft 48 resulting in the draft links 32 being raised by the lift links 44 and the draft hook 59 being engaged with the upper hitch part 28 and the inserts 73 being engaged with the plow hitch parts 30. If the hitch parts 30 are canted to the horizontal at the time of hitching, they still will become completely seated in the inserts 73 since the inserts will pivot on the dowel pins 78. Once the hitch parts 30 are seated, any suitable latch means may be used to block the entrance to the openings to the jaws 36 to prevent the hitch parts from becoming dislodged during operation. Engagement of the upper hook 59 with the implement part 28 deflects the actuator 58 downwardly against the resistance of the spring 70 in order to engage the opening of the jaw 64 with the part 28 since the actuator 58 is suspended from the arch member 52 so as to locate the jaw opening at a level above an upper hitch part when the lower hitch parts are connected to the draft hooks 34. Once the upper hitch part 28 is received in the opening of the jaw 64, the spring 70 acts to bias the bottom of the opening against the hitch part.

Assuming the plow 16 to be in operation, the operator will normally have the hydraulic controls positioned for automatic draft control with the on-off valve 170 being in its "off" position and with the on-off valve 172 being in its "on" position. The soil resistance acting on the plow 16 creates a draft force in the lower links 32, which force is imposed on the A-frame 42 and causes the latter to move rearwardly, as permitted by the pin and slot means 144, to deflect the ends of the elastic bar 140. When a predetermined draft load is exerted on the A-frame, and thus on the ends of the bar 140, the midportion of the elastic bar will be deflected far enough forwardly to permit the light spring 150 to pivot the signal lever 146 and shift the control valve 160 leftwardly to connect the pump to the rockshaft cylinder 50 to actuate the latter for raising the draft links 32 resulting in the lifting of the plow 16. When the draft loads decrease to the preselected amount, the elastic bar 140 straightens out and acts against the lever 146 to return the valve 160 to its neutral position. Similarly, but in a reverse manner, the rockshaft cylinder 50 is actuated to lower the plow 16 deeper into the ground to increase the draft load when the draft loads imposed on the A-frame decrease below the preselected amount.

Assuming that the hitch structure is in the three-point hitch mode shown in FIG. 3, the hitch structure can quickly and easily be converted to the weight transfer mode shown in FIG. 7. Specifically, to accomplish the conversion, the operator will need only to disconnect the upper draft hook 60 from the actuator 58, to disconnect the spring cartridge 67 and rod 69 respectively from the bight portion 66 and the swivel connection 72 to move the swivel bracket 100 from its stored position (not shown) on one of the legs of the arch member 52 to its operative position (FIG. 7) on the transverse bight portion 66 of the arch member and to then connect the actuator 58 to the swivel block.

The hitch structure is now in condition to be coupled to a trailing implement such as the disk plow 80 (FIG. 6) or a power take-off driven implement such as the implement 110 (FIG. 10). Assuming that the hitch structure is to be coupled to the disk plow 80, the clevis 88 of the plow may be connected, in the usual manner, either to the crossbar 89 when seated in the openings of the lower draft hooks 34 or to the tractor drawbar 120 after the tractor backed to dispose the crossbar 89 or drawbar close to the clevis 88 of the disk tongue 86. The force transmitting link 92 will then be fastened between the tongue 86 and the swivel bracket 100 to complete the connection. This latter operation may require the swivel bracket 100 to be adjusted fore-and-aft and such adjustment is accomplished in the same manner described above relative to the fore-and-aft adjustment of the upper draft hook 60.

When the disk harrow 80 is in operation, the operator will normally desire automatic weight transfer control. To obtain this control, the on-off valve 170 is shifted to its "on" position, the on-off valve 172 concerning draft control then being in its "off" position. Automatic weight transfer control is then accomplished in the same manner described above relative to automatic draft control. Specifically, draft loads are transferred to the A-frame 42 either through the draft links 32 or the drawbar 120 and cause the elastic bar 140 to deflect in response to draft forces which are above and below a predetermined force, to actuate the main valve 160 to respectively cause retraction and extension of the actuator 58 to increase and decrease the pull on the force transmitting link 92 and cause a commensurate increase and decrease in the portion of the weight of the disk harrow 80 supported by the tractor 10. The mounting of the swivel bracket 100 on the arch member 52 maintains a substantially constant relationship between the force transmitting link 92 and the tongue 86 when the tractor 10 is turning since the bracket 100 will roll along the bight portion of the arch member in the direction of the turn.

With the hitch structure arranged in the weight transfer mode, the tractor 10 can be connected to an implement having a power take-off driven tool or conveyor or the like such as the implement 110 in much the same manner described above relative to connecting the tractor to the disk harrow 80. Now, however, the clevis at the forward end of the tongue 116 is connected only to the tractor drawbar 120 and the lower draft arms 32 are held elevated to provide adequate clearance beneath the arch member 52 for the power shaft 112 which is connected to the tractor power take-off 114.

Figure 12:
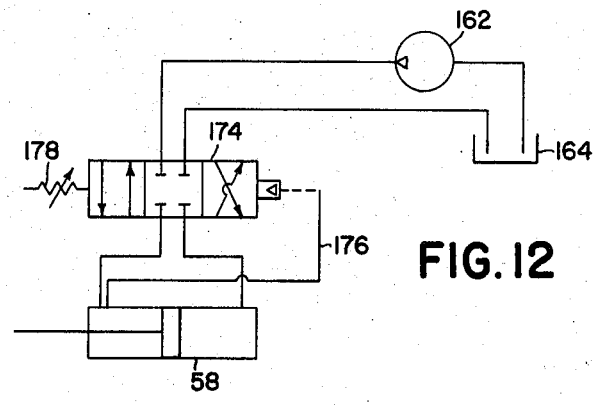
FIG. 12 is a schematic of a modified hydraulic circuit used to control the extension and retraction of the center link of the hitch system.

Referring now to FIG. 12, there is shown a modified control means for automatically controlling the extension and retraction of the actuator 58 in response to the draft load carried by the actuator 58 as reflected by the pressure of the fluid in the rearward end of the actuator 58. Such a modified control is applicable to tractors which do not have means for sensing draft imposed on their lower draft links or their drawbars. Specifically, a pressure responsive, three-position control valve 174 is connected, at one side, to the pump 162 and the reservoir and, at its other side, to the opposite work ports of the actuator 58. A pilot line 176 interconnects the rearward end of the actuator cylinder with a piston (not shown) at the right end of the valve 174. Acting on the left end of the valve 174 is a variable neutralizing spring 178 for holding the valve 174 in a neutral position, as shown, when a preselected pressure is acting on the valve 174. Thus, it is seen that when increased draft loads cause the pressure in the rearward end of the cylinder of the actuator 58 to increase above the preselected pressure, the control valve 174 will shift to the left and connect the rearward and forward ends of the actuator cylinder respectively to the reservoir and the pump resulting in the extension of the actuator 58. It follows then that when the pressure in the rearward end of the cylinder of the actuator 58 falls below the preselected pressure, the valve 174 will shift rightwardly and connect the pump and reservoir to the actuator 58 so as to cause the latter to retract. This has the effect of maintaining a constant amount of weight transfer no matter that hill and swale conditions are encountered.

Thus the control means shown in FIG. 12 does not require the A-frame 42, the elastic bar 140 and the attendant control linkage shown in FIG. 11 and, therefore, may be used on a wide variety of tractors.

We claim:

1. For a tractor and trailing implement combination wherein the tractor has hitch means including trailing lower draft links, a generally upright member pivotally connected to the draft links for fore-and-aft rocking about a generally horizontal transverse axis and having an upper portion spaced above and extending transversely relative to the lower draft links, and an upper draft link having opposite ends respectively pivotally connected to the tractor and the upper portion of the upright member, the implement having ground-engaging means supporting the weight thereof and having a forwardly extending draft means connected to said hitch means, a force transmitting member connected between the implement and the upper portion of the upright member, a hydraulic system including an extendible and retractable hydraulic motor and control means therefor, one of the upper draft links and force transmitting members incorporating said motor, the control means including draft sensing means incorporated in said hitch means for transmitting a signal representative of draft loads imposed on the hitch means and including valve means coupled to said sensing means and responsive to signals transmitted thereby for causing contraction of said motor for transferring a selected portion of the implement weight to the tractor, the improvement comprising: the connection between the upper portion of the upright member and the upper link and the force transmitting member including connection means mounted on said upper portion for movement therealong.

2. The invention defined in claim 1 wherein the hitch means further includes a drawbar pivoted to the tractor for generally horizontal swinging, and said implement draft member means being connected to the drawbar.

3. The invention defined in claim 1 wherein said upper draft link incorporates an extendible and retractable hydraulic motor; weight transfer control means including a three-position pressure responsive valve means for controlling the extension and retraction of said hydraulic motor; a pilot line means connecting the fluid pressure in one end of the motor with said valve means for shifting the valve means in a first direction toward a first active position and biasing means acting on the valve means opposite to the first direction for shifting the valve means to a second active position; and said biasing means and pilot pressure cooperating to hold the valve means in a neutral position intermediate said first and second positions when a preselected pilot pressure exists in said pilot line means.

* * * * *